July 11, 1933. V. L. VOLPICELLI 1,917,561
AEROPLANE
Filed Oct. 11, 1932 3 Sheets-Sheet 1
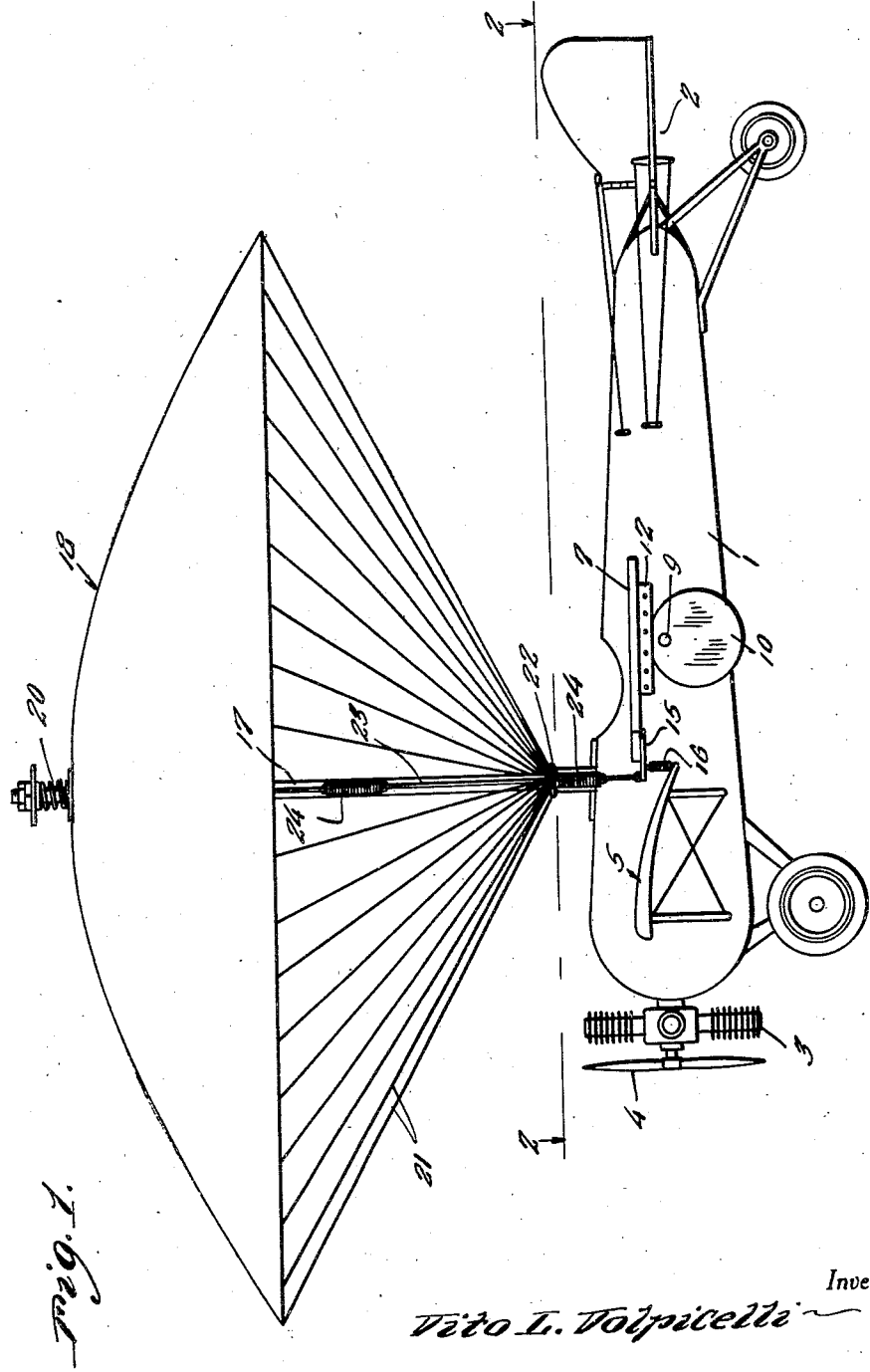
Inventor
Vito L. Volpicelli
By Clarence A. O'Brien
Attorney July 11, 1933. V. L. VOLPICELLI 1,917,561
AEROPLANE
Filed Oct. 11, 1932 3 Sheets-Sheet 2
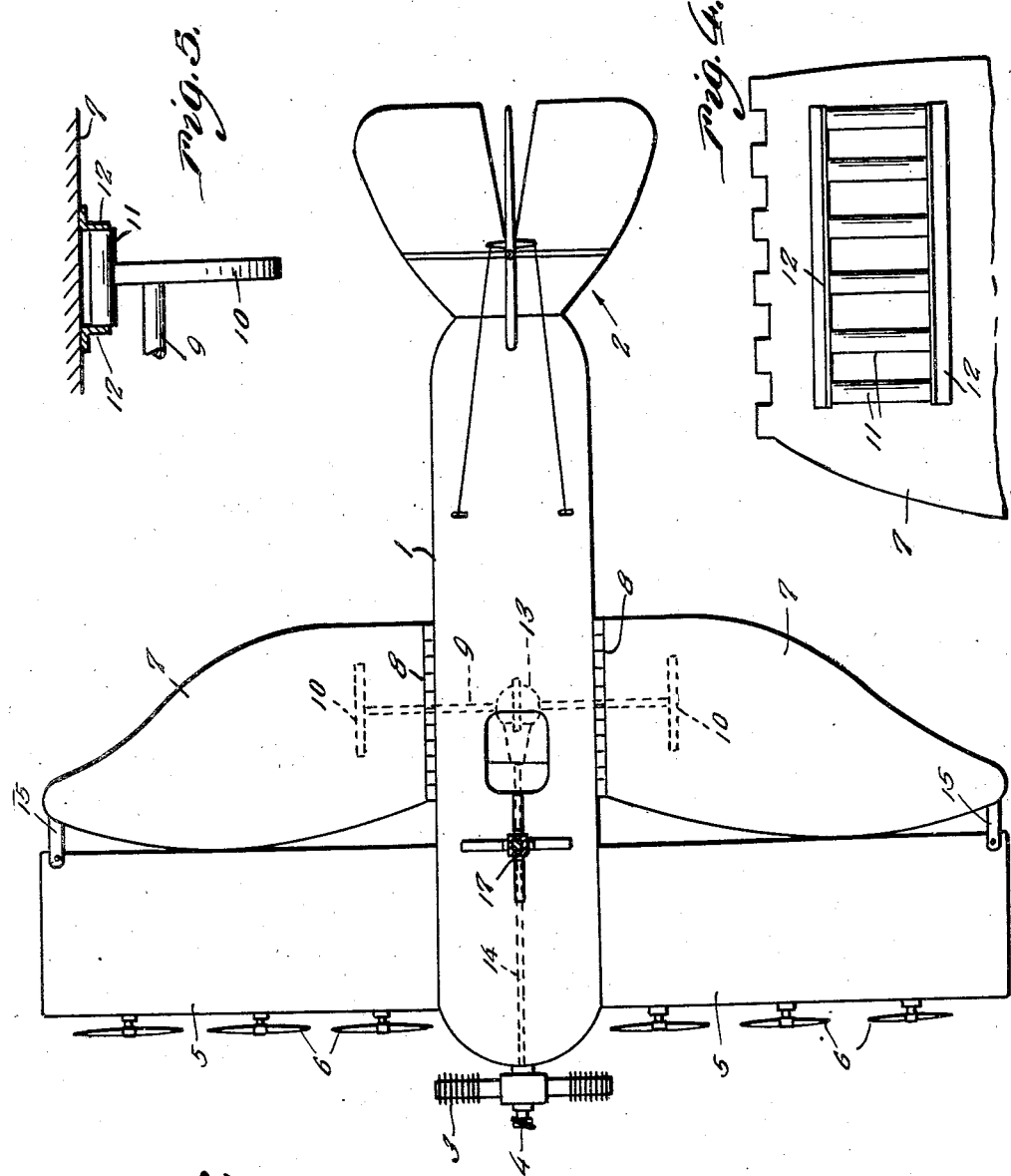
Inventor
Vito L. Volpicelli
By Clarence A. O'Brien
Attorney

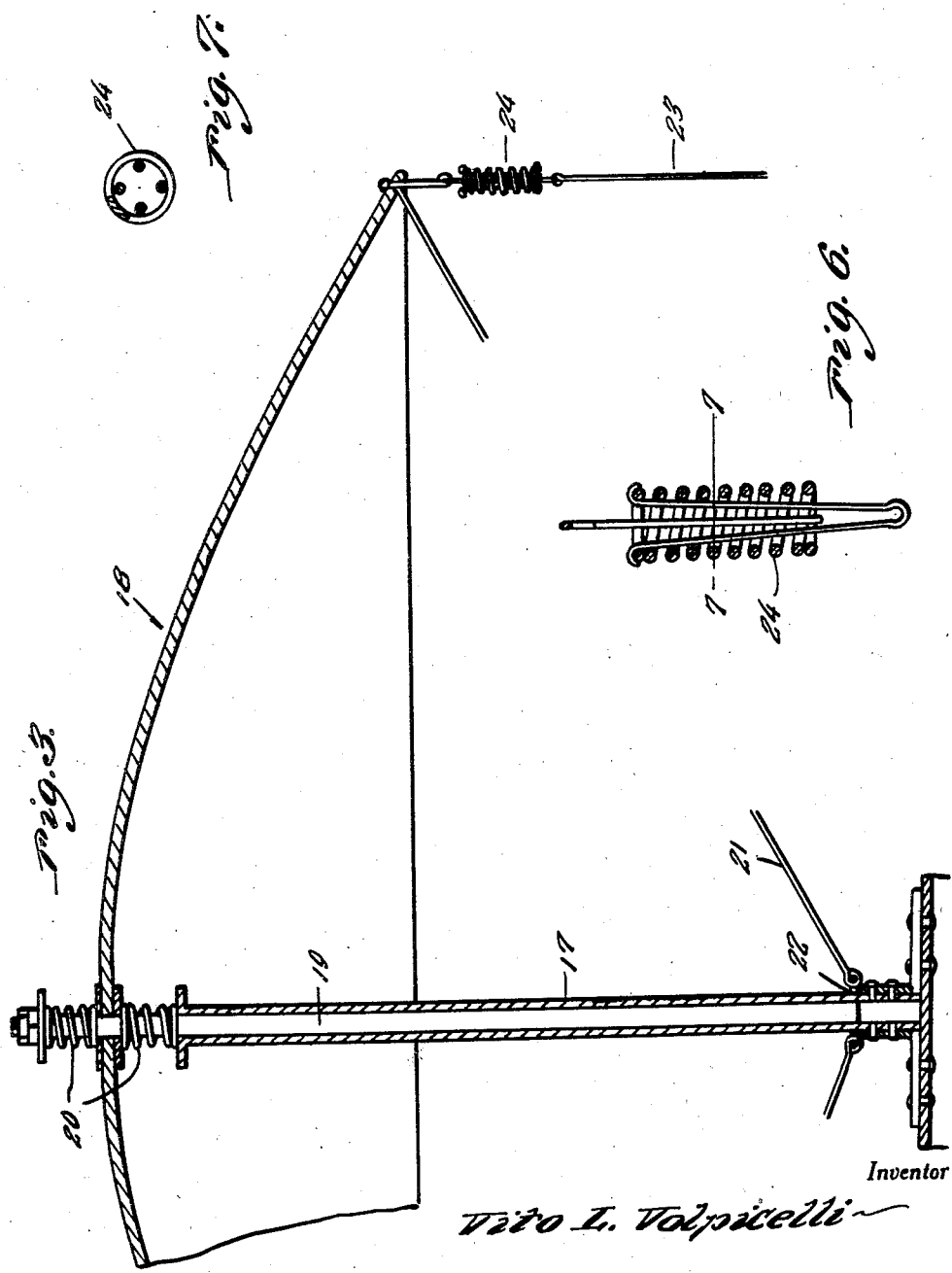

Patented July 11, 1933

1,917,561

UNITED STATES PATENT OFFICE

VITO LEORETO VOLPICELLI, OF SCRANTON, PENNSYLVANIA

AEROPLANE

Application filed October 11, 1932. Serial No. 637,303.

The present invention relates to new and useful improvements in aeroplanes and has for some of its objects to provide, in a manner as hereinafter set forth, an aeroplane which will be simple in construction, strong, durable, light in weight, which will be safe, which is capable of lifting comparatively heavy loads, which is capable of flying great distances without stopping, which may take off from and land on small areas, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of an aeroplane constructed in accordance with the present invention.

Fig. 2 is a view in horizontal section, taken substantially on the line 2—2 of Fig. 1.

Fig. 3 is a view in vertical section through a portion of the parachute.

Fig. 4 is a detail view in bottom plan of the inner end portion of one of the pivoted wings.

Fig. 5 is a detail view showing the means for actuating the pivoted wings.

Fig. 6 is a detail view in vertical section through one of the resilient parachute brace elements.

Fig. 7 is a detail view in horizontal section, taken substantially on the line 7—7 of Fig. 6.

Referring now to the drawings in detail, it will be seen that the embodiment of the invention has been illustrated and comprises a fuselage 1 on the rear of which is mounted a tail assembly which is designated generally by the reference numeral 2. On the nose of the fuselage 1 is a radial engine 3 which drives a propeller 4. Stationary wings 5 project laterally from the forward end portion of the fuselage 1 and said wings may have mounted thereon engines driving propellers 6.

Pivoted wings 7 are hingedly mounted, as at 8, on the sides of the fuselage 1 rearwardly of the stationary wings 5. A shaft 9 is journalled transversely in the fuselage 1 and projects laterally therefrom beneath the wings 7 and has fixed on its ends cams 10 which raise the wings 7. A series of rollers 11 are journalled in suitable bearings 12 on the lower side of each wing 7 with which the cams 10 are engaged. The shaft 9 is operatively connected in any suitable manner, as at 13, to the shaft 14 from the engine 3. Arms 15 project forwardly from the tip portions of the wings 7 and are connected to the stationary wings 5 by springs 16 which maintain the wings 7 in engagement with the cams 10 at all times.

Rising from the fuselage 1 at the center of gravity of the aeroplane is a tube 17 which constitutes the supporting member of a permanently open parachute which is designated generally by the reference numeral 18. The parachute 18 is substantially concavo-convex and is formed of suitable metal, preferably aluminum. A shaft 19 is mounted for vertical sliding movement in the tube 17 and extends centrally through the parachute 18, shock absorbing springs 20 being provided above and below said parachute 18 on the shaft 19.

Braces 21 extend from a ring 22 which encircles the tube 17 to the peripheral portion of the parachute 18. Rods 23, having resilient connections 24 interposed therein, extend from the parachute 18 to the arms 15 of the wings 7.

In operation, the aeroplane is drawn forwardly in the usual manner by the propellers 4 and 6, the stationary wings 5 functioning to lift the aeroplane, as usual. The pivoted wings 7 assist in propelling and lifting the aeroplane, said wings 7 functioning in substantially the same manner as the wings of a bird. In case of engine failure or should it be desirable or necessary for any other reason to make a landing on a comparatively small area, this may be accomplished with safety through the medium of the constantly open parachute 18 which is capable of lowering the aeroplane gently to the ground.

It is believed that the many advantages of an aeroplane constructed in accordance with the present invention will be readily understood, and although the preferred embodiment of the invention is as shown and described, it is to be understood that changes in the details of construction, and in the combination and arrangement of parts may be resorted to which will fall within the scope of the invention as claimed.

Having thus described my invention, what I claim as new is:—

An aeroplane comprising a fuselage, an engine mounted on the fuselage, a propeller operatively connected to the engine for actuation thereby, stationary wings mounted on the fuselage, pivoted wings hingedly mounted on the fuselage, a shaft journalled transversely of the fuselage and projecting therefrom beneath the pivoted wings, means operatively connecting the shaft to the engine for actuation thereby, rollers journalled on the lower side of the pivoted wings, cams fixed on the shafts and engaged with the rollers for actuating the pivoted wings in one direction, arms mounted on the free end portions of the pivoted wings, and coiled springs extending between the arms and the stationary wings for actuating the pivoted wings in the opposite direction.

In testimony whereof I affix my signature.

VITO LEORETO VOLPICELLI.